(No Model.)
C. T. OWENS.
STEAM COOKING VESSEL.
No. 546,678. Patented Sept. 24, 1895.
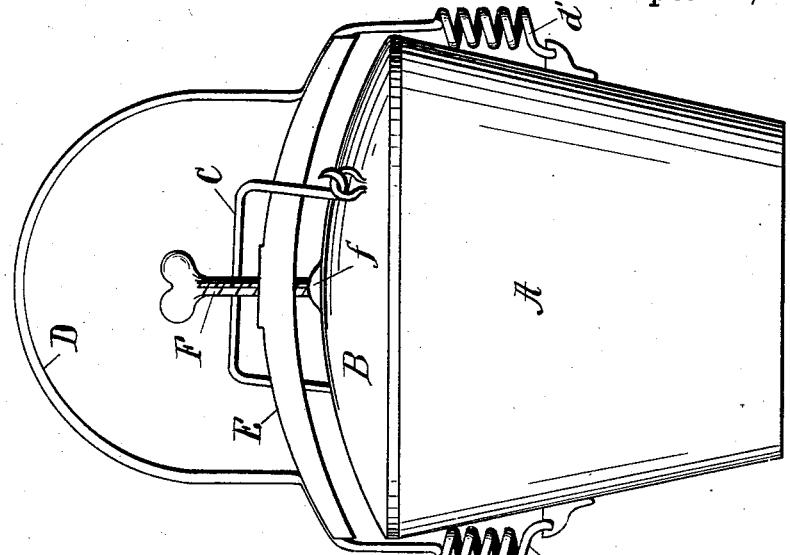
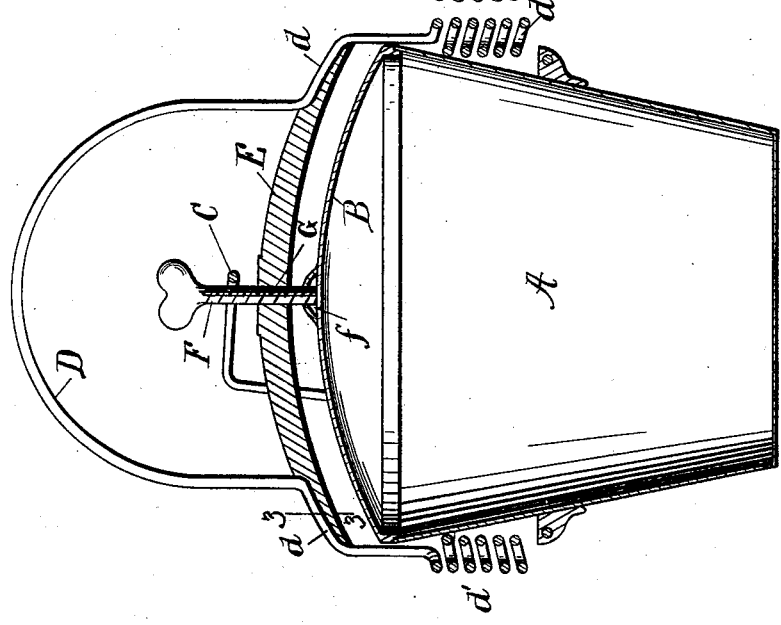
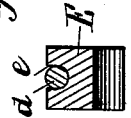
Witnesses:
Jos. H. Milans
J. S. Barker
Inventor:
Charles T. Owens
By Charles William B. King
Attys.

UNITED STATES PATENT OFFICE.

CHARLES T. OWENS, OF SNOW, ASSIGNOR OF ONE-HALF TO S. P. OWENS, OF ARDMORE, MISSOURI.

STEAM COOKING-VESSEL.

SPECIFICATION forming part of Letters Patent No. 546,678, dated September 24, 1895.

Application filed June 3, 1895. Serial No. 551,550. (No model.)

*To all whom it may concern:*

Be it known that I, CHARLES T. OWENS, a citizen of the United States of America, residing at Snow, in the county of Macon and State of Missouri, have invented certain new and useful Improvements in Steam Cooking-Vessels; and I do hereby declare the following to be a full, clear, and exact description of the invention, such as will enable others skilled in the art to which it appertains to make and use the same.

My invention relates to steam cooking-vessels, and has for its object to provide a vessel of this character wherein food may be cooked while subject to a steam-pressure above that of the atmosphere.

The improvements which constitute my invention will be pointed out hereinafter.

In the drawings, wherein is illustrated a cooking-vessel embodying my improvements, Figure 1 is an elevation. Fig. 2 is a vertical section. Fig. 3 is a detail sectional view on the line 3 3 of Fig. 2.

In the said drawings, A represents a cooking-vessel which may be of any suitable shape and which is preferably constructed of steel, as I have found that best adapted to withstand the steam-pressure to which it may be subjected. The cover B fits the open end of the vessel practically steam-tight, it having a square or flat bearing upon the edge of the vessel, as represented in Fig. 2. The cover is preferably provided with a handle or bail C for convenience in manipulating the same.

D represents the bail or handle of the vessel. It is connected with the opposite sides of the vessel at points some distance below its upper edge and is provided with two turned-in portions $d$, which, when the bail is in place and standing upright, are arranged a short distance above the cover of the vessel and extend over the edge of the same. The bail or handle D is provided, between the turned-in portions $d$ and the places of attachment to the vessel, with the springs $d'$ $d'$, which are preferably constructed by coiling the rod or wire of which the bail is formed.

E represents a cross-bar, which is arranged above the cover of the vessel and extends from one leg of the bail D to the other and has engagement therewith. The ends of the cross-bar are provided upon their upper surfaces with shallow grooves $e$, and in these grooves rest the turned-in portions $d$ of the bail when the cross-bar is in place. This furnishes a secure engagement between the cross-bar and the spring-bail, which is very desirable.

F represents a screw which has engagement with a nut or threaded aperture G in the cross-bar, while its lower end engages with a socket $f$ at the center of the cover B.

When the parts of my cooking apparatus are arranged as shown in Figs. 1 and 2, it will be understood that the steam will be confined within the vessel until sufficient pressure is attained within the vessel to lift the cover against the action of the springs $d'$ $d'$, which tend to hold it in place, and it will also be understood that the amount of pressure required to thus lift the cover and give vent to the steam may be varied by adjusting the screw F, and thereby putting the springs under a greater or less degree of tension. It will be observed that the force of the two springs is applied at the center of the cover, which I have found to be an advantage, as the pressure of the springs is distributed equally all around the cover.

In the construction of my apparatus I prefer that the cover should be slightly concavo-convex in shape, in order to give it greater strength and prevent its being distorted by the pressure to which it is subjected, and when thus made the cross-bar E is curved so as to be substantially parallel with the outer surface of the cover.

Having thus described my invention, what I claim, and desire to secure by Letters Patent, is—

1. The combination of a vessel, a cover fitting steam-tight, a spring bail, a cross-bar arranged above the cover and between the opposite legs of the spring bail, and a connection between the said cross-bar and the cover, bearing upon the latter at substantially its central portion, substantially as set forth.

2. The combination of a vessel, its cover, the spring bail, a cross-bar between the opposite legs of the bail and having engagement therewith, and a screw mounted in the crosspiece and having bearing upon the cover, substantially as set forth.

3. The combination of the vessel, the cover, the spring bail having in-turned portions, $d'$, a cross-bar having its ends grooved to engage with the in-turned portions of the spring bail, and a bearing piece carried by the cross-bar and adapted to engage with the cover, substantially as set forth.

4. The combination of a cooking vessel, a cover fitting the same steam-tight, the spring bail, D, having the coiled spring portions, $d'$, and the in-turned portions adapted to overlie the edge of the cover, a cross-bar, E, and a screw, F, in the cross-bar and adapted to engage with the cover at substantially its central portion, substantially as set forth.

In testimony whereof I affix my signature in presence of two witnesses.

CHARLES T. OWENS.

Witnesses:
   CHAS. RICHEY,
   W. C. HARDISTER.